Aug. 23, 1927.
T. E. BURNER
1,639,837
CORNSTALK SHREDDER
Filed Jan. 12, 1925    3 Sheets-Sheet 3
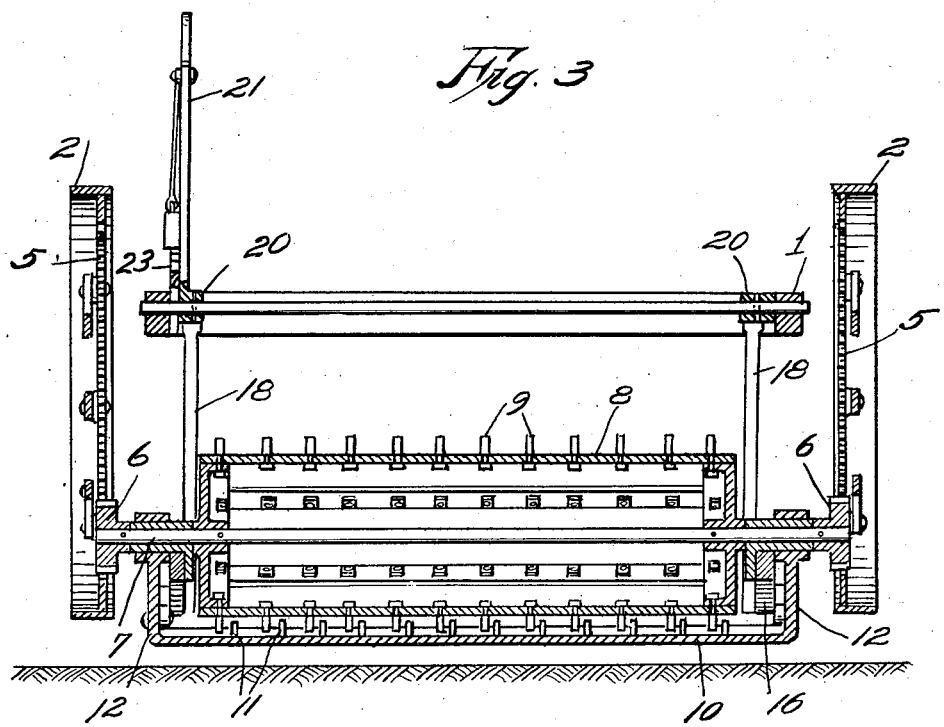
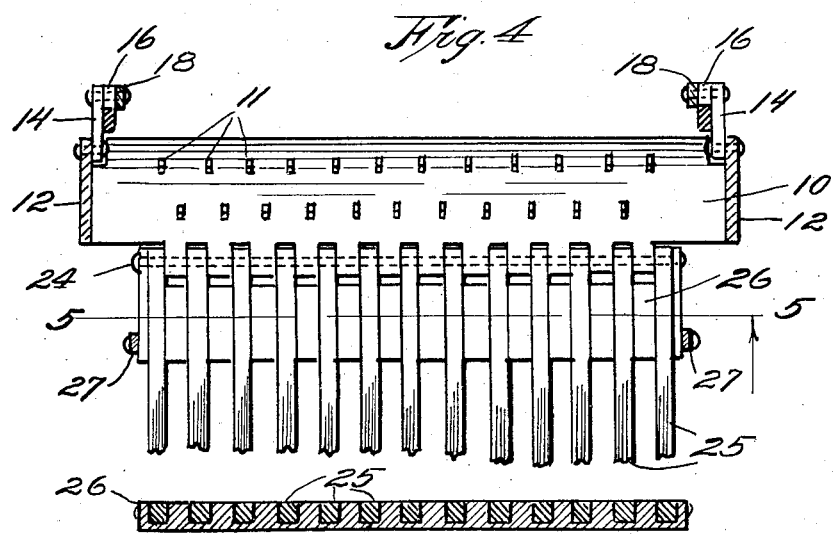
INVENTOR.
Thomas E. Burner
BY Thomas E. Scofield
ATTORNEY.
Witness:
R. E. Hamilton Patented Aug. 23, 1927.

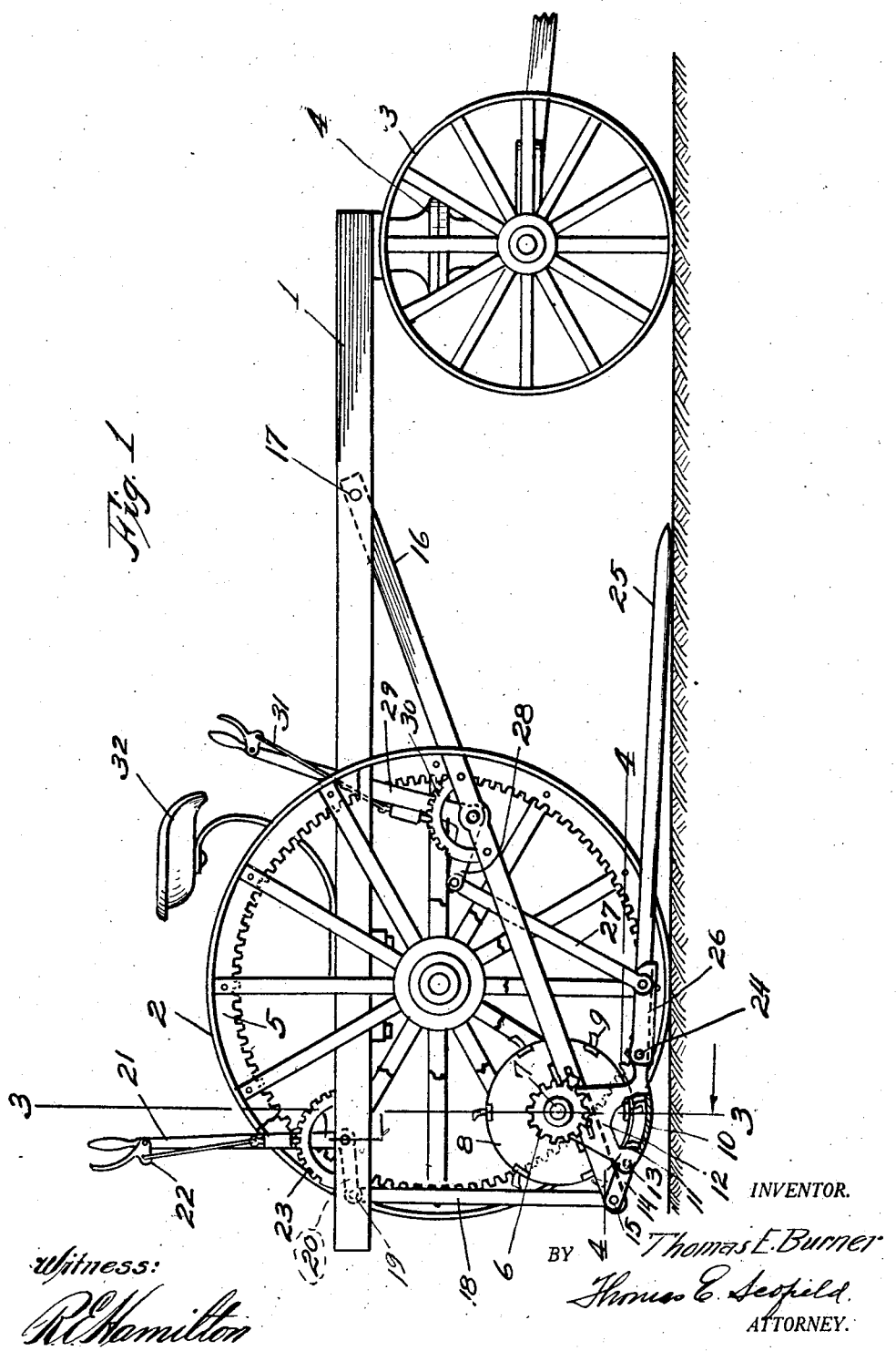

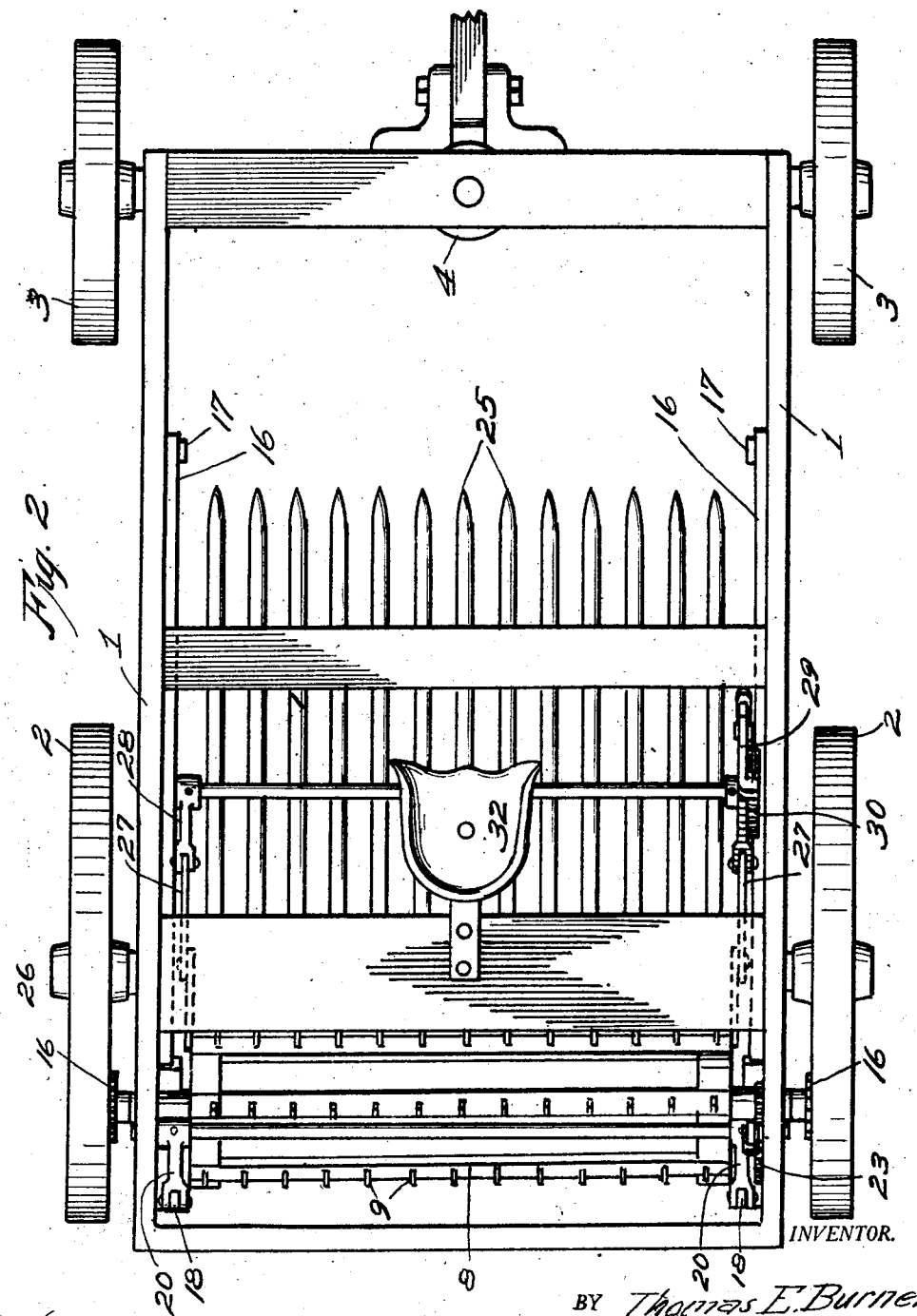

1,639,837

UNITED STATES PATENT OFFICE.

THOMAS E. BURNER, OF CARTHAGE, ILLINOIS.

CORNSTALK SHREDDER.

Application filed January 12, 1925. Serial No. 1,771.

This invention relates to improvements in corn stalk shredders, and refers more particularly to a mechanical device which may be pulled over a corn field after harvesting and the corn stalks shredded and disintegrated into relatively fine straw, facilitating its combination again with the soil for fertilizing purposes.

Heretofore farmers have experienced considerable trouble in breaking up and disintegrating corn stalks and in handling the ground when the corn stalks are not properly broken up and torn to pieces. Where the ordinary corn stalk cutter is used, the stalks are cut into twelve-inch lengths without shredding the fibers and producing short, rigid lengths of the stalks which are a great nuisance in plowing or otherwise cultivating a field either before planting or after the crop is planted, especially if the second crop is corn, due to the fact that it is necessary to cultivate, and these short lengths of the corn stalks greatly hinder proper cultivation.

The particular advantages of the mechanism, which is the subject-matter of this invention, are that it renders more efficient farm implements and tools, such as disk plows, harrows, cultivators or common hand plows. Also, the stalks being shredded to relatively small, thin, fibrous strips, readily rot and disintegrate, causing the stalk material to become more readily available as plant food for the succeeding crops. Further, the disintegration of the stalks into a material in the nature of straw permits the ground to be more easily worked and eliminates difficulties heretofore well known to the farmer where corn stalks are left in the field to rot without being broken up and shredded in the manner hereinafter described.

Fig. 1 is a side elevational view of the device.

Fig. 2 is a plan view.

Fig. 3 is a view taken along the line 3—3 in Fig. 1.

Fig. 4 is a view taken along the line 4—4 in Fig. 1.

Fig. 5 is a view taken along the line 5—5 in Fig. 4.

Referring to the drawings, a frame 1 is mounted upon rear ground wheels 2 and front wheels 3. The front wheels are pivoted on a fifth wheel turning arrangement, shown diagrammatically at 4. The rear wheels have internal gears 5 which mesh with pinions 6 mounted upon shaft 7 which supports a cylinder 8. Upon the periphery of this cylinder are a plurality of blades or cutters 9. Below the cylinder is positioned a concave element 10 upon which are situated stationary cutters 11, shown in Figs. 3 and 4. These stationary cutting elements are postioned in staggered relation with the rotating elements on the periphery of the cylinder in order that the rotating cutters will pass in relatively close relation with the stationary elements during operation. The concave element is suspended from the shaft 7 by means of brackets 12. At the rear of the concave element is pivoted at 13 a link 14 which is connected at 15 to the tilting bar 16,—the opposite end of the bar being pivoted to the frame at 17. Vertical links 18 pivoted at 15 to the tilting bars and at 19 to the crank arm 20 of the control handle 21, furnishes a means for raising the cutting assembly in an operative position raising the gears 6 out of mesh with the ground wheel gears 5. The handle 21 is adjustable and may be set in any desired position by means of the spring latch device 22 engaging the toothed quadrant 23. At the forward end of the concave are pivoted upon a rod 24 a plurality of teeth or tines 25 which extend forward substantially parallel to the ground and are anywhere from two feet to six feet in length. These teeth are so fastened to the concave by means of a corrugated or troughed support member 27 to permit vertical play of the forward ends of the teeth in order to compensate for the unevenness and inequality of the ground. It is obvious that the teeth will have this vertical play independent of each other, thus serving to rake up the stalks as the device is pulled through the field in spite of the unevenness of the ground.

The rake support 26 has connection through links 27 to the crank arms 28 connected to the control handle 29. This handle may be likewise adjusted by means of the tooth quadrant 30 and spring latch 31 to any desired position,—the function of the lifting handle being primarily to raise the teeth from the ground in an inoperative position when the device is to be shifted from field to field or is to be transported, at which time it is desirable to have the teeth raised to an inoperative position.

The functioning of the mechanism is briefly as follows:

The corn stalk shredder is hauled over a corn field after the corn has been harvested, either by horse or tractor power, the teeth 25 being lowered to act similarly as the teeth of a bull rake, picking up the stalks from the ground and feeding them rearwardly between the concave and the cutting cylinder which have been set in a shredding position by means of the handle 21. A single operator is seated at 32 from which position he can control the cutting and tilting device. The stalks, while going between the cylinder and the concave, are shredded into relatively fine straw, which is discharged from the rear of the cylinder back on to the ground where it may be easily worked with the earth or very readily combined with the soil by rotting due to its disintegrated condition. The tilting device also facilitates the turning of the machine at which time the pivoting of the machine might cause the breaking of the elongated tines. As described, the machine is operated by horse or mechanical power. The width of the machine may be varied in order to include any desired number of rows of corn. Normally, a width of including two rows is sufficient, although it is understood that the invention is not limited in any way to any particular dimensions. The device may thus be used to rapidly break up and disintegrate in relatively fine particles the corn stalks and as a consequence there is less difficulty in further cultivating the ground for further crops.

The machine as hereinbefore explained may be converted into a hay tedder by removing the concave and its related parts. With the concave removed, the machine may be pulled through a hay field after the hay has been cut. The hay will be picked up by the long teeth 25 and fed to the cylinder where it will be torn apart and uniformly distributed behind the machine, loosely separated in an ideal manner for drying and as effectively as a hay tedder intended solely for this purpose. The purpose of removing the concave is to allow the hay to pass over the cylinder without obstruction.

I claim as my invention:

1. In a corn shredder, the combination with a frame mounted on ground wheels, having gears mounted thereon, of raking teeth manually adjustable from the frame for collecting the stalks from the ground, a gear driven shredding assembly having gears meshing with internal gears on the ground wheels to drive the shredder and manually operated means for raising the assembly and removing the assembly from driving relation with the ground wheels.

2. In a corn shredder, the combination with a frame mounted on ground wheels of spaced apart raking teeth mounted thereon for collecting stalks from the ground, stationary disintegrating members, a rotating shredder driven from the ground wheels and adapted to coact with the stationary members to shred the stalks and distribute the shredded stalks to the ground, means for adjusting the position of the raking teeth and means for raising the cutting assembly out of driving relation with the driving mechanism.

3. In a corn shredder, the combination with a frame mounted on ground wheels, having gears mounted thereon, of raking teeth manually adjustable from the frame for collecting the stalks from the ground, a cutting or shredding assembly comprising a lower stationary member having cutters and a rotating drum with cutters on the periphery thereof adapted to coact with the stationary cutters to shred the stalks, said shredding assembly carried by and driven by gears meshing with gears on the ground wheels.

THOMAS E. BURNER.